(12) United States Patent
Neeman et al.

(10) Patent No.: US 9,934,309 B2
(45) Date of Patent: Apr. 3, 2018

(54) QUERY CONVERSION FOR CONVERTING STRUCTURED QUERIES INTO UNSTRUCTURED QUERIES FOR SEARCHING UNSTRUCTURED DATA

(71) Applicant: Splunk Inc., San Francisco, CA (US)

(72) Inventors: Itay Neeman, Seattle, WA (US); Bradford H. Lovering, Seattle, WA (US)

(73) Assignee: SPLUNK INC., San Francisco, CA (US)

( * ) Notice: Subject to any disclaimer, the term of this patent is extended or adjusted under 35 U.S.C. 154(b) by 0 days.

(21) Appl. No.: 15/473,532

(22) Filed: Mar. 29, 2017

(65) Prior Publication Data

US 2017/0206205 A1     Jul. 20, 2017

Related U.S. Application Data

(63) Continuation of application No. 15/421,429, filed on Jan. 31, 2017, which is a continuation of application No. 14/611,106, filed on Jan. 30, 2015, now Pat. No. 9,594,828, which is a continuation of application No. 14/266,833, filed on May 1, 2014, now Pat. No. 9,122,746, which is a continuation of application No. 13/956,258, filed on Jul. 31, 2013, now Pat. No. 8,751,486.

(51) Int. Cl.
*G06F 17/30* (2006.01)

(52) U.S. Cl.
CPC .... *G06F 17/3066* (2013.01); *G06F 17/30696* (2013.01)

(58) Field of Classification Search
CPC .................................................. G06F 17/3066
See application file for complete search history.

(56) References Cited

U.S. PATENT DOCUMENTS

| | | |
|---|---|---|
| 7,536,634 B2 | 5/2009 | Green et al. |
| 7,653,652 B2 | 1/2010 | Kagalwala et al. |
| 8,112,383 B2 | 2/2012 | Acheson et al. |
| 8,751,486 B1 | 6/2014 | Neeman et al. |

(Continued)

OTHER PUBLICATIONS

**"Apache Cassandra ODBC Driver," [online] retrieved on Jul. 31, 2013, retrieved from the Internet: <http://www.simba.com/connectors/apache-cassandra-odbc>, 9 pages.

(Continued)

*Primary Examiner* — Kris Mackes
(74) *Attorney, Agent, or Firm* — Perkins Coie LLP

(57) ABSTRACT

Technologies are described herein for executing queries expressed with reference to a structured query language against unstructured data. A user issues a structured query through a traditional structured data management ("SDM") application. Upon receiving the structured query, an SDM driver analyzes the structured query and extracts a data structure from the unstructured data, if necessary. The structured query is then converted to an unstructured query based on the extracted data structure. The converted unstructured query may then be executed against the unstructured data. Results from the query are reorganized into structured data utilizing the extracted data structure and are then presented to the user through the SDM application.

32 Claims, 9 Drawing Sheets

(56) References Cited

U.S. PATENT DOCUMENTS

| | | | |
|---|---|---|---|
| 8,806,160 | B2 | 8/2014 | Colgrove et al. |
| 9,122,746 | B2 | 9/2015 | Neeman et al. |
| 9,594,828 | B2 | 3/2017 | Neeman et al. |
| 2004/0181533 | A1 | 9/2004 | Santosuosso |
| 2004/0186826 | A1 | 9/2004 | Choi et al. |
| 2005/0256865 | A1 | 11/2005 | Ma et al. |
| 2005/0289138 | A1 | 12/2005 | Cheng et al. |
| 2006/0074881 | A1 | 4/2006 | Vembu et al. |
| 2007/0203893 | A1 | 8/2007 | Krinsky et al. |
| 2007/0299832 | A1 | 12/2007 | Chang et al. |
| 2008/0275691 | A1 | 11/2008 | Summerlin et al. |
| 2008/0294613 | A1 | 11/2008 | Iyer et al. |
| 2009/0119257 | A1 | 5/2009 | Waters et al. |
| 2011/0208774 | A1 | 8/2011 | Breining et al. |
| 2012/0191704 | A1 | 7/2012 | Jones et al. |
| 2013/0054642 | A1 | 2/2013 | Morin et al. |
| 2013/0080452 | A1 | 3/2013 | Hosie et al. |
| 2013/0304770 | A1 | 11/2013 | Boero et al. |
| 2014/0129559 | A1* | 5/2014 | Estes ............... G06F 17/30424 707/737 |
| 2014/0136541 | A1 | 5/2014 | Farahat et al. |
| 2014/0282392 | A1* | 9/2014 | Shukla ................ G06F 9/443 717/116 |
| 2017/0139928 | A1 | 5/2017 | Neeman et al. |

OTHER PUBLICATIONS

\*\*"Google BigQuery ODBC Driver," retrieved on Jul. 31, 2013, retrieved from <http://www.simba.com/connectors/google-bigguery-odbc>, 9 pages.

\*\*"MongoDB ODBC Driver with SQL Connector," retrieved on Jul. 31, 2013, <retrieved from http://www.simba.com/connectors/mongodb-odbc>, 9 pages.

\*\*"Salesforce ODBC Driver with SQL Connector," retrieved on Jul. 31, 2013, retrieved from: <http://www.simba.com/connectors/salesforce-odbc>, 8 pages.

\*\*"Simba MongoDB ODBC Driver with SQL Connector, User Guide," retrieved on Jul. 31, 2013, retrieved from <http://www.simba.com/wpcontent/uploads/2013/05/Simba-MongoDB-ODBC-Driver-User-Guide.pdf>, Mar. 14, 2013, 18 pages.

\*\*"Simba ODB Driver with SQL Connector for Apache Cassandra," Installation and Configuration Guide, <http://www.simba.com/wpcontent/uploads/2013/07/Sim ba-ODBC-Driver-for-Cassandra>, May 7, 2013, 13 pages.

\*\*"Simba ODB Driver with SQL Connector for Salesforce Installation and Configuration Guide," retrieved from: <3 http://www.simba.com/wp-content/uploads/2013/05/Simba-Salesforce-ODBC>, May 28, 2013, 15 pages.

\*\*"Simba ODBC Driver with SQL Connector for Google BigQuery," Installation and Configuration Guide, retrieved on Jul. 31, 2013, retrieved from: <http://www.simba com/wp-content/uploads/2013/05/Simba>, Apr. 22, 2013, 11 pages.

\*\*"Simba ODBC Driver with SQL Connector for Salesforce," Manual Installation Guide, retrieved on Jul. 31, 2013, retrieved from: <http/ /www.simba.comiw2-content/u12loads/2013/05/Sirn ba-ODBC-Driver-for-Salesforce-Manual-Install-Guide.Qdf>, May 29, 2013, 14 pages.

\*\*"Splunk Enterprise Product Data Sheet," retrieved on Jul. 2013, retrieved from: <http://splunk.com/web_assets/pdf/secure/Splunk_Product_datasheet.pdf>, 2 pages.

\*\*Bitincka, L. et al., "Optimizing Data Analysis with a Semi-Structured Time Series Database", In SLAML, '10, Jul. 31, 2013, 9 Pages.

\*\*Advisory Action dated Dec. 11, 2014, U.S. Appl. No. 14/266,833 of Neeman, I. et al. filed May 1, 2014.

\*\*Final Office Action dated Aug. 25, 2014, U.S. Appl. No. 14/266,833 of Neeman, I. et al. filed May 1, 2014.

Non-Final Office Action dated Mar. 29, 2016, U.S. Appl. No. 14/611,106 of Neeman, I. et al. filed Jan. 30, 2015.

Final Office Action dated Aug. 26, 2016, U.S. Appl. No. 14/611,106 of Neeman, I. et al. filed Jan. 30, 2015.

Final Office Action dated Sep. 16, 2015, U.S. Appl. No. 14/611,106 of Neeman, I. et al. filed Jan. 30, 2015.

Notice of Allowance dated Jan. 3, 2017, U.S. Appl. No. 14/611,106 of Neeman, I. et al. filed Jan. 30, 2015.

Non-Final Office Action dated Jul. 23, 2015, U.S. Appl. No. 14/611,106 of Neeman, I. et al. filed Jan. 30, 2015.

\*\*Non-Final Office Action dated Jul. 8, 2014, U.S. Appl. No. 14/266,833 of Neeman, I. et al. filed May 1, 2014.

\*\*Non-Final Office Action dated Mar. 27, 2015, U.S. Appl. No. 14/266,833 of Neeman, I. et al. filed May 1, 2014.

\*\*Notice of Allowance dated May 15, 2015, U.S. Appl. No. 14/266,833 of Neeman, I. et al. filed May 1, 2014.

\*\*Non-Final Office Action dated May 10, 2017, for U.S. Appl. No. 15/421,429 of Neeman, I. et al. filed Jan. 31, 2017.

\*\*Notice of Allowance dated Mar. 7, 2014, for U.S. Appl. No. 13/956,258, filed Jul. 31, 2013.

\*\*Non-Final Office Action dated Oct. 16, 2013 for U.S. Appl. No. 13/956,258 of Neeman, I. et al. filed Jul. 31, 2013.

\* cited by examiner

| DATE | TIME | LABEL | EVENT TEXT |
|---|---|---|---|
| 06-07-2010 | 12:49:21.955 | INFO | databasePartitionPolicy - No databases found starting fresh ! |
| 06-08-2010 | 11:14:00.836 | WARN | pipeline - Exiting pipeline parsing gracefully: got eExit from processor sendOut |
| 06-10-2010 | 06:29:53.749 | INFO | Metrics - group=queue, name=typingqueue, max_size=1000, filled_count=0, ... |
| 06-10-2010 | 06:30:24.449 | INFO | Metrics - group=pipeline, name=indexerpipe, processor=indexandforward, ... |

Fig. 6

QUERY CONVERSION FOR CONVERTING STRUCTURED QUERIES INTO UNSTRUCTURED QUERIES FOR SEARCHING UNSTRUCTURED DATA

This application is a continuation of U.S. patent application Ser. No. 15/421,429 filed on Jan. 31, 2017, titled "QUERY CONVERSION FOR CONVERTING STRUCTURED QUERIES INTO UNSTRUCTURED QUERIES FOR SEARCHING UNSTRUCTURED DATA", which is a continuation of U.S. patent application Ser. No. 14/611,106 filed on Jan. 30, 2015, titled "EXECUTING STRUCTURED QUERIES ON TEXT RECORDS OF UNSTRUCTURED DATA", now U.S. Pat. No. 9,594,828, issued on Mar. 14, 2017, which is a continuation of U.S. patent application Ser. No. 14/266,833 filed on May 1, 2014, titled "EXECUTING STRUCTURED QUERIES ON UNSTRUCTURED DATA", now U.S. Pat. No. 9,122,746, issued Sep. 1, 2015, which is a continuation of U.S. patent application Ser. No. 13/956,258 filed on Jul. 31, 2013, titled "EXECUTING STRUCTURED QUERIES ON UNSTRUCTURED DATA", now U.S. Pat. No. 8,751,486, issued on Jun. 10, 2014, all of which are incorporated by reference herein in their entirety.

BACKGROUND

Many types of computing system components generate abundant and diverse machine data. For example, components utilized in large computing environments by corporations, governmental agencies, and academic institutions may generate many different types of log data describing aspects of their operation. This log data, such as machine-generated syslog and web-server logs, is typically unstructured and, as a result, is not defined or otherwise organized according to a fixed structure. Although this machine data is unstructured, this data may contain valuable information, such as data identifying user transactions, customer behaviors, sensor activity, machine behavior, security threats, fraudulent activity, and more. However, due to the lack of structure in this data, managing unstructured data such as system logs can be challenging.

Traditional structured data management ("SDM") applications, such as business intelligence ("BI") applications, have the capability to connect to structured databases, such as relational databases, and perform interactive queries and charting against the data stored in the database. Examples of SDM applications include, but are not limited to, MICROSOFT EXCEL from MICROSOFT Corporation of Redmond, Wash., and the TABLEAU family of products from TABLEAU SOFTWARE of Seattle, Wash.

Traditional SDM applications, however, only have the capability to connect to structured databases and cannot utilize unstructured data such as the logs described above. As a consequence, users who are familiar the operations of SDM applications are typically unable to leverage their experience with the SDM applications when utilizing applications that provide functionality for searching and otherwise utilizing unstructured data such as machine data.

It is with respect to these and other considerations that the disclosure made herein is presented.

SUMMARY

Technologies are described herein for executing structured queries on unstructured data. Through the utilization of the technologies and concepts presented herein, functionality can be provided that allows a user to utilize, and in particular, to perform queries on unstructured data via SDM applications. Since SDM applications only support structured data and operations associated therewith, a query submitted through SDM applications is intended for use with structured data. These queries are typically based upon the structure of the structured data, such as a query formatted in Structured Query Language ("SQL") following the Open Database Connectivity ("ODBC") standard. Such a query is referred to herein as a "structured query." By enabling execution of structured queries on unstructured data, the technologies described herein make it possible for users who are more comfortable and familiar with traditional SDM applications to query and otherwise utilize data stored in an unstructured data store using the SDM applications with which they are familiar.

According to one aspect presented herein, a computer-implemented mechanism is disclosed for allowing structured queries to be executed on unstructured data. In particular, a structured query may be received from an SDM application. In order for such a structured query to be executed on unstructured data stored in an unstructured data store, a pilot query may be conducted on a subset of the unstructured data to identify a data structure in the unstructured data. Based on the identified data structure, the structured query may be converted into an unstructured query that can be executed on the unstructured data. The query results obtained from the unstructured data may then be reorganized into structured query results according to the identified data structure. The structured query results may then be presented to the user through functionality provided by the SDM application.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 is an unstructured data diagram illustrating identifying fields in unstructured data, according to one embodiment disclosed herein;

DETAILED DESCRIPTION

Figure 1:
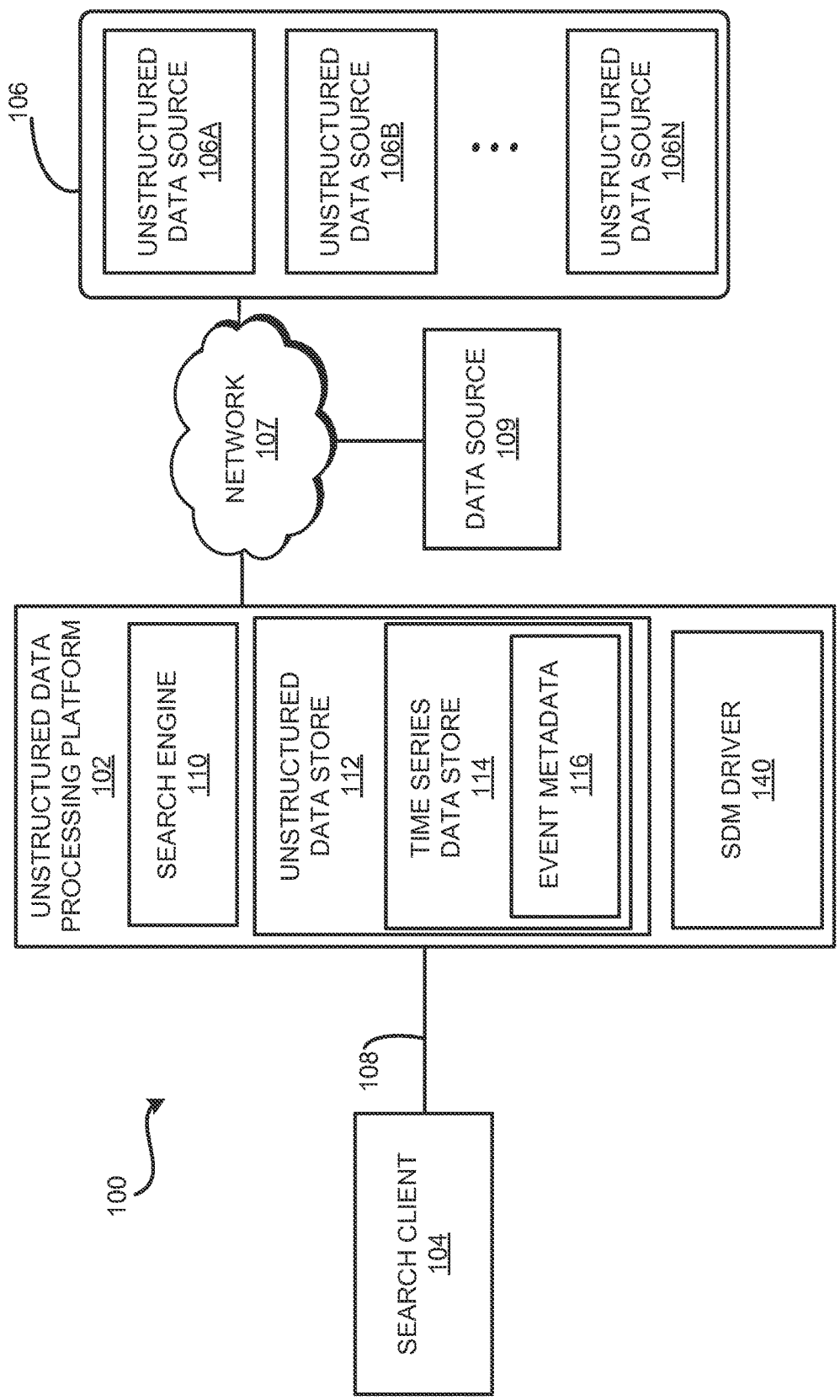
FIG. 1 is a system diagram showing aspects of an illustrative operating environment for the technologies disclosed herein for executing structured queries on unstructured data according to embodiments presented herein.

Embodiments of the disclosure presented herein encompass methods, systems, apparatuses, and computer-readable media for executing structured queries against unstructured data. In the following detailed description, references are made to the accompanying drawings that form a part hereof, and in which are shown by way of illustration specific embodiments or examples. Referring now to the drawings, in which like numerals represent like elements throughout the several figures, aspects of an exemplary operating environment and the implementations provided herein will be described.

FIG. 1 and the following discussion are intended to provide a brief, general description of a suitable operating environment 100 in which embodiments presented herein may be implemented. It should be appreciated that not all components shown in the operating environment 100, and described in each embodiment presented herein, may be required to practice the presently disclosed subject matter.

The operating environment 100 shown in FIG. 1 includes an unstructured data processing platform 102. The unstructured data processing platform 102 facilitates searches requested by a search client 104 on unstructured data provided by unstructured data sources 106A-106N (hereinafter referred to collectively and/or generically as "the unstructured data sources 106").

As used herein, the term "unstructured data" refers to data that is not defined or organized according to a fixed structure. Unstructured data may be contrasted with data stored in a database, which is an example of "structured data." It should be appreciated that unstructured data may be fully unstructured, in which no structure of the data in a dataset is defined, or "loosely structured," in which some of the data in a dataset has a structure while other data in the same dataset has no identifiable structure. As used herein, the term "unstructured data" includes all data types that are not fully structured. Types of unstructured data may include, but are not limited to, machine data such as logs generated by hardware or software components. Unstructured data might also include other types of data, such as images, video, audio, documents, text, social media messages, and the like.

The unstructured raw data may be segmented into events, and fields may be identified in those events. As used herein, a "field" is a definition of where to find a particular piece of information in an event containing a segment of raw data. It should be recognized that in a large collection of events, not all events will contain the same kinds of information. So in some configurations, a field may be defined for all events derived from a particular source (as each of these events is likely to contain similar kinds of information), but a field may alternatively be defined for any subset of events that have the same piece of information. A field may have a rule for how to extract a value from a given event and an identification of all the events to which it can be applied to extract a value. It should be understood that fields are often identified by a name (or other label) describing what the value extracted from any given event for the field represents.

As used herein, "event data" may refer to unstructured data of an event that is collected about a system and that has a notion of time, such as via timestamps or event sequences that are captured in the unstructured data, including, for example, an action, characteristic, condition (or state), or state change of a system. For example, such events may be about a computing system's performance, actions taken by the computing system, or the like. In one particular use scenario, the event data is obtained from various computing log files generated by a computer's operating system, such as a system log. For example, one line in a system log might identify one particular event. It should be appreciated that the unstructured data collected from a computer or network, including weblogs and machine data, are only one type of unstructured data. The event data might also be obtained from other types of programs, devices, and/or resources. In fact, any type of structured or semi-structured data that contains a notion of time and from which business or operational intelligence can be derived may be used to obtain event data. In this regard, it should be appreciated that event data may not be restricted by a file format or structure from which the event data is obtained.

The unstructured data processing platform 102 may receive data from the unstructured data sources 106 through a network 107. The unstructured data sources 106 may be computing systems that generate data or may be computing systems that transmit data generated by another computing system to the unstructured data processing platform 102. For example, the unstructured data source 106A may be a computer associated with an Internet service provider. The unstructured data source 106A may generate web logs of Internet activity in an unstructured format, and transmit those logs to the unstructured data processing platform 102. It should be understood that the present disclosure is not limited to any "remote" or "local" configuration for the unstructured data sources 106, as one or more of the unstructured data sources 106 may be executing on the same computing system as the unstructured data processing platform 102.

The unstructured data processing platform 102 might permit various types of processing on the unstructured data, such as statistical analyses and other types of operations. As described briefly above, the unstructured data sources 106 may include log data generated by hardware and software components, such as security components, web servers, email servers, and file services. File services may include documents, spreadsheets, as well as video, audio and image files. It should be appreciated that, although the unstructured data sources 106 are illustrated as separate components, the unstructured data sources 106 may be from one computing system or component, or multiple computing systems or components. Moreover, it should also be appreciated that, in contrast with traditional structured data processing systems, no portion of the unstructured data generated by the unstructured data sources 106 may be discarded. By retaining all of the unstructured data in certain configurations, a relative level of flexibility may be retained to identify meaningful aspects of the unstructured data as a relatively greater knowledge is obtained regarding its structure.

The search client 104 may receive instructions, from a user or other entity (not shown), to perform a search on unstructured data generated or provided by one or more of the unstructured data sources 106 and may provide results of the search to the requesting user or other entity. An entity may be a process or component operated by the unstructured data processing platform 102 that performs a function that consumes the search results in some manner. The instructions to perform a search may include instructions to automatically perform a search for a metric, such as a particular time, a value, a range of values, and the like. As used herein, a "metric" may be a field value, a calculation on values derived from an event, a statistic calculated on events that meet some criteria, or a statistic calculated on data in events that meet some criteria. In some configurations, a metric may be used to describe data associated with a field of data. For example, a metric may be CPU usage in a certain type of unstructured machine data. A metric may also include one or more metrics. In one example, the value of the metric may be a calculation on a data source group, examples of which include average CPU usage, average memory usages, total amount of memory used, and the like. The presently disclosed subject matter is not limited to any particular type, form, or function of a metric.

The search client 104 transmits instructions to the unstructured data processing platform 102 via communication pathway 108. The communication pathway 108 may vary depending on the configuration of the operating environment 100. For example, and not by way of limitation, the unstructured data processing platform 102 and the search client 104 may reside on the same computing device or reside on different computing devices in a local area network ("LAN"), wide area network ("WAN"), distributed computing environment, and the like. The presently disclosed subject matter is not limited to any particular environment for the operating environment 100.

The search request may include request to be executed on the unstructured data sources 106 as well as other types of data, illustrated in FIG. 1 as data source 109. In response to receiving a search request from the search client 104, the unstructured data processing platform 102 may utilize a search engine 110 to perform the requested search. The search request may, but is not required to, include instructions to perform a search or a query to retrieve search results from previously performed searches.

In order to perform the search, the search engine 110 accesses an unstructured data store 112. The unstructured data store 112 is utilized to store unstructured data received from the unstructured data sources 106 prior to any extraction of information, including timestamps, contained in or associated with the data. The unstructured data store 112 may be utilized as the incoming data store for the data from either the unstructured data sources 106 or the data source 109. After the data from either the unstructured data sources 106 or the data source 109 is received and stored in the unstructured data store 112, in a process called indexing, the data is segmented into events, a timestamp is extracted from each event, and each timestamped event is stored in a retrievable way in a time series data store 114. After indexing, the raw data need not be retained in its original form, but preferably, the indexed events collectively contain all of the raw data.

An exemplary time series data store may be SPLUNK ENTERPRISE developed by SPLUNK INC. of San Francisco, Calif., which indexes and stored all kinds of data, including unstructured data, and provides searching, querying, reporting, alerting, dash boarding and report generation capabilities on the indexed data in the data store. The unstructured data store 112 and the time series data store 114 may be provided by the same data store or may be separate data stores.

It should be noted that some unstructured data, and thus event data obtained therefrom, may have associated "metadata." In such a scenario, metadata for each event may be stored in the time series data store 114 as event metadata 116. The event metadata 116 may include but is not limited to the following for each event: a timestamp, the data source, the data source type, and the host to which the event relates.

Searches on events in the time series data store 114 may permit filtering or constraining the results by criteria related to any of this metadata 116. For example, a search over a given time period may return all events whose timestamps fall within the time period. Preferably, the time series data store is optimized to permit searching for events whose timestamps fall within specified time periods by organizing events with timestamps close in time to one another in "event chunks" that are stored close to each other in memory or in the same location (e.g., on the same server). Likewise, if it is expected that searches will seek out more recent events more frequently, the time series data store may be optimized for such searches by storing more recent events in faster memory such as flash and older events in slower memory such as a hard drive.

Schema that applies structure to the data in the unstructured data store 112 may be applied at the time a search is performed. As used herein, "schema" is a set of fields that a query can use to specify criteria for what events should be returned in response to the query. In some configurations, a schema is not applied until the time a search is performed. This process is referred to herein as a "late binding schema." Schema applied when the data is first received in the unstructured data store 112 may be referred to herein as "early binding schema." In some configurations, a schema (in this case, a late binding schema) may be applied at search time to extract values for the fields from events to identify which events meet field criteria specified in the search. Once defined, the fields may be searched by the search engine 110 to find data relevant to the search query. The schema may also be used for purposes in addition to or other than searching, such as filtering specific events, calculating metrics, and the like. In this sense, schema imposes structure on the data.

In an exemplary embodiment of the present invention, the search engine 110 may repeatedly perform a search on unstructured data provided by one or more of the unstructured data sources 106 to monitor metrics defined by the search instructions provided by the search client 104. A schema may include one or more fields from which metrics may be searched for and retrieved.

For example, it may be desirable to monitor CPU usage of one or more servers. Log data describing the CPU usage of the servers may be presented to the unstructured data processing platform 102 as one or more of the unstructured data sources 106. The unstructured data store 112 may segment the log data into timestamped searchable events that it stores in the time series data store 114, portioned into event chunks by timestamp.

In this exemplary scenario, the search engine 110 may be instructed to search for real-time (or near real-time) CPU usage data entering the time series data store 114. The search engine 110 may query the time series data store 114 to retrieve data that was generated during recent time and that is associated with the search schema. In this example, the data would include CPU usage data provided by one or more of the unstructured data sources 106. The search engine 110 may thereafter transmit the results of the search to the search client 104. In some configurations, the search client 104 and the search engine 110 may operate in a "pull" configuration, whereby the results are not transmitted until the search client 104 requests the results of the search. The search results may be stored until retrieval, or may be discarded at periodic times to reduce memory usage. These and other aspects of the operation of the unstructured data processing platform 102 will be explained and illustrated in more detail in FIG. 8.

In one embodiment, the operating environment 100 may also include a structured data management ("SDM") driver 140. The SDM driver 140 accepts and translates structured queries into unstructured queries understood by the unstructured data processing platform 102 and thus allows the structured queries to be executed on the unstructured data managed by the unstructured data processing platform 102 by executing the translated unstructured queries. In embodiments, the SDM driver 140 may act as an interface between an SDM application (described below) or any other application that operates only on structured data, and the unstructured data processing platform 102 that provides access to and operations on unstructured data. By employing the SDM driver 140, the SDM application or the other applications may be connected to unstructured data managed by the unstructured data processing platform 102, and allow a user to manage the unstructured data through the SDM application or the other applications. According to various implementations, the SDM driver 140 may be implemented as a module inside the unstructured data processing platform 102 as shown in FIG. 1, or a module separating from the unstructured data processing platform 102. By implementing the SDM driver 140 as a module inside the unstructured data processing platform 102 as shown in FIG. 1, the unstructured data processing platform 102 is enabled to accept structured queries from any sources, including, but are not limited to the SDM applications, to be performed on the unstructured data. Additional aspects regarding the operation of the SDM driver 140 and related components are provided below with regard to FIGS. 2-7.

Figure 2:
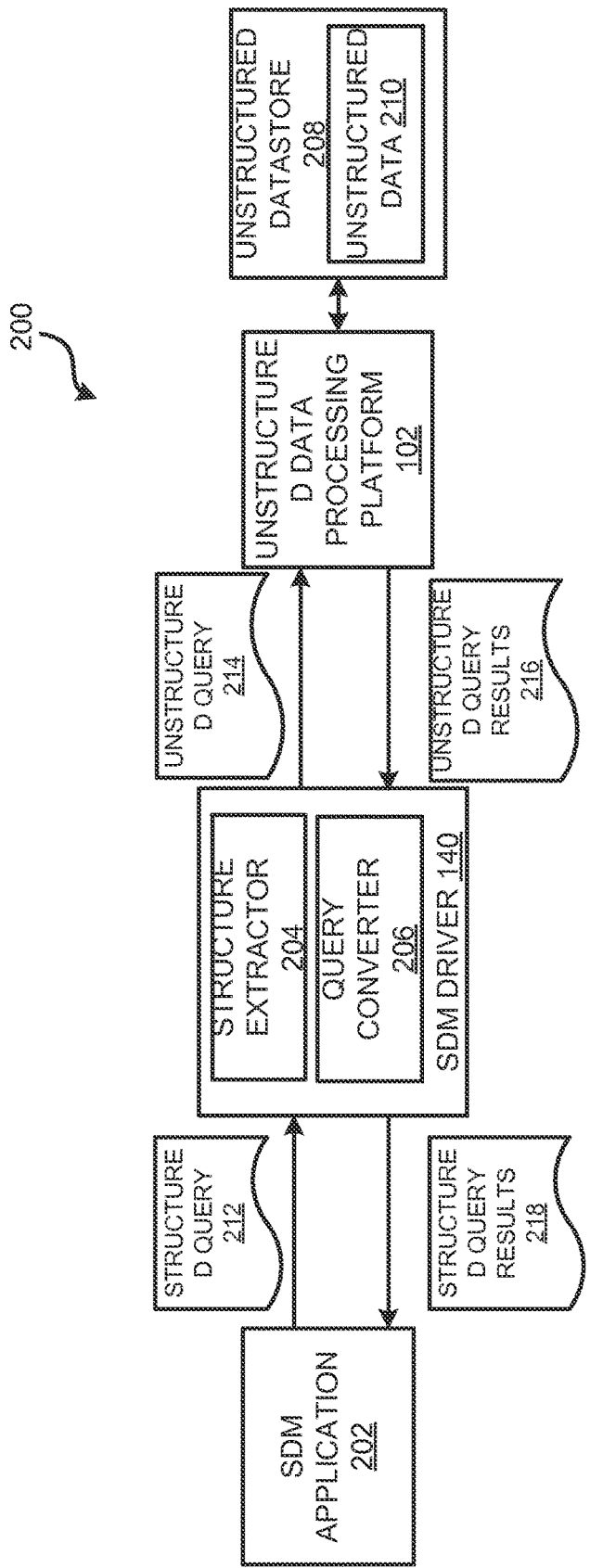
FIG. 2 is a software architecture diagram illustrating aspects of an SDM driver configured to interact with an SDM application and an unstructured data processing platform, according to one or more embodiments presented herein.

Referring now to FIG. 2, a software architecture diagram will be described that illustrates aspects of the interaction between an SDM application 202, the SDM driver 140, and the unstructured data processing platform 102, according to one or more embodiments presented herein. As mentioned briefly above respect to FIG. 1, an SDM driver 140 may be utilized to allow a user of an SDM application 202 to access unstructured data 210 stored in an unstructured data store 208 and managed by the unstructured data processing platform 102. More specifically, the SDM driver 140 enables a structured query 212 submitted via the SDM application 202 to be executed on the unstructured data 210. The unstructured data 210 includes, but is not limited to, any data stored in the unstructured data store 112, including data in the time series store 114, the event metadata 116, raw unstructured data from the unstructured data source 106, and potentially other types of unstructured data.

The SDM driver 140 may include a structure extractor 204 and a query converter 206 in some embodiments. When needed, the structure extractor 204 extracts a data structure from the unstructured data 210. According to embodiments, such a data structure may include structured data units, data fields in each structured data unit and properties of each data field. Additional details regarding the extracted data structure will be presented below with regard to FIGS. 3-6.

The query converter 206 can be used to convert a structured query 212 issued through the SDM application 202 to an unstructured query 214. As mentioned above, a structured query 212 is any query that can be executed directly on structured data, such as a query with SQL commands to be executed on data maintained in a relational database. In contrast to a structured query, which is executed against structured data typically stored in a database, an unstructured query 214 is a query that is executed against unstructured data 210. An unstructured query 214 may include query commands that are written in an unstructured query language, such as the Search Processing Language ("SPL") developed by SPLUNK, INC. of San Francisco, Calif. Other types of languages might also be utilized for generating unstructured queries 214. The converted unstructured query 214 may then be performed by the unstructured data processing platform 102 on the unstructured data 210. Additional details regarding the operation of the unstructured data processing platform 102 for performing the unstructured query 214 will be provided below with regard to FIG. 8.

Query results returned by the unstructured data processing platform 102 may be unstructured query results 216, and therefore may be unsuitable for presentation to a user through the SDM application 202 due to the differences between unstructured data and structured data. Thus, the unstructured query results 216 need to be mapped to structured query results 218. The structure extractor 204 may perform such a mapping based on the extracted data structure of the unstructured data 210. For instance, data in the unstructured query results 216 that correspond to various data fields of a structured data unit may be extracted and organized according to these data fields and their properties. The generated/mapped query results may then be returned as the structured query results 218 to the SDM application 202 and presented to the user through the SDM application 202 in a traditional fashion. It should be understood that this embodiment is exemplary, and should not be viewed as being limiting in any way. Other modules in the SDM driver 140 can provide the functionality described herein for converting the unstructured query results 216 to structured query results 218. In this regard, it should be appreciated that other components or combinations of components might also be utilized to provide the functionality described herein as being provided by the SDM driver 140.

Figure 3:
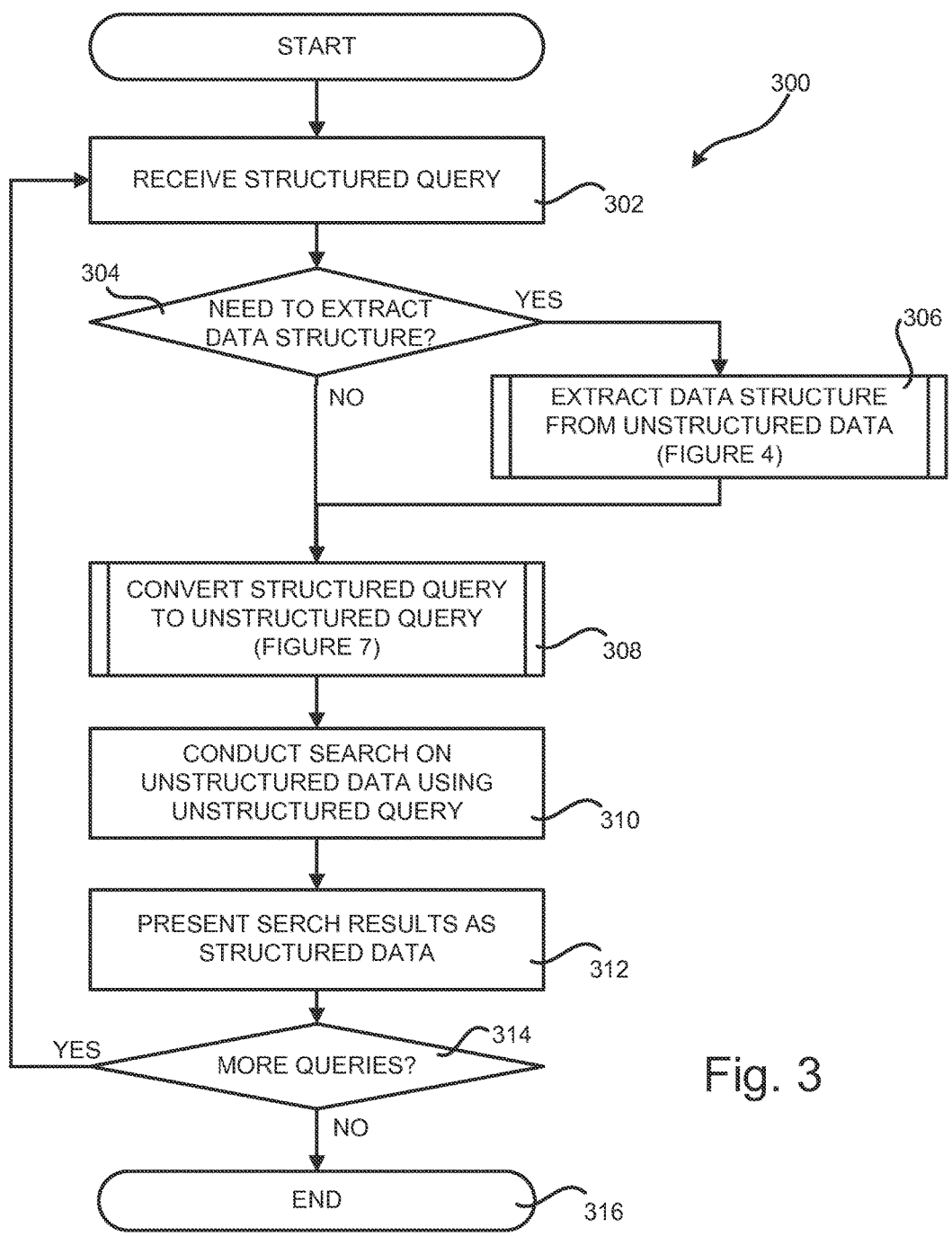
FIG. 3 is a flow diagram showing aspects of one illustrative process for enabling a user of an SDM application to execute a structured query on unstructured data, according to embodiments disclosed herein.

FIG. 3 is a flow diagram showing aspects of one illustrative routine 300 for enabling a user of an SDM application 202 to execute a structured query 212 on unstructured data 210, according to embodiments disclosed herein. In one embodiment, the SDM driver 140 described above with regard to FIGS. 1 and 2 perform the routine 300. It should be appreciated, however, that the routine 300 might also be performed by other modules and/or components of the unstructured data processing platform 102, or by a combination of modules and components in the unstructured data processing platform 102, and/or in the SDM application 202.

It should also be appreciated that the logical operations described herein with respect to FIG. 3, and the other FIGURES, may be implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGURES and described herein. These operations may also be performed in parallel, or in a different order than those described herein.

The routine 300 begins at operation 302, wherein the SDM driver 140 receives a structured query 212 from the SDM application 202. According to various implementations, the structured query 212 may be directly issued by a user of the SDM application 202 or generated by the SDM application 202 in response to a related request from the user. The structured query 212 might also be generated in other ways, such as by a software or hardware component.

From operation 302, the routine 300 proceeds to operation 304, wherein a determination is made based on the received structured query 212 whether a data structure of the unstructured data 210 needs to be extracted in order to perform the requested query. For example, the received structured query 212 might be a description command requesting a description of a structured data unit, such as the SQL command "describe TableA," where "TableA" is the name of a table as understood by the SQL. If such a description command was received and it is determined that no existing data structure has been extracted for the unstructured data 210, then a data structure needs to be extracted.

Alternatively, the received structured query 212 might be a query for retrieving data from the unstructured data 210, such as to show certain field(s) of the data. In scenarios when the requested field does not exist in the previously extracted data structure, a new data structure may need to be extracted from the unstructured data 210 in order to fulfill the query. For example, the SQL query "SELECT title FROM Book" requests that data from the column "title" of all the rows of the table "Book" be shown. In this example, if a data structure for the table "Book" that includes a column "title" has already been extracted previously, it may be determined that there is no need to extract a new data structure. If, however, no data structure has been extracted or the existing data structure does not include the column "title," a new data structure may then need to be extracted.

It should be appreciated that the scenarios and examples presented above, and elsewhere herein, are for illustration only and should not be construed as limiting. Other situations or factors might also be considered when determining whether a data structure needs to be extracted, such as if the previously extracted data structure is outdated, if the structured query contains invalid element(s) in view of the current data structure, and so on. In a different embodiment, the SDM driver 140 may be configured to extract the data structure of the relevant unstructured data each time a structured query 212 is received.

If it is determined at operation 304 that no data structure needs to be extracted, the routine 300 proceeds to operation 308. Otherwise, the routine 300 proceeds to operation 306, where a data structure may be extracted from the unstructured data 210. As discussed above, the extracted data structure may contain components such as structured data units, data fields in each structured data unit and properties of each data field. According to one implement, the extraction of a data structure may be realized by building a mapping between each component of a data structure with one or more elements of the unstructured data 210, such as data set(s), data properties and/or statistics. Additional details regarding extracting a data structure from unstructured data 210 will be provided below with regard to FIGS. 4-6.

From operation 306, the routine 300 proceeds to operation 308, where the structured query 212 is converted into an unstructured query 214 that can be understood by the unstructured data processing platform 102. Additional details regarding the conversion from the structured query 212 to the unstructured query 214 will be provided below with respect to FIG. 7.

From operation 308, the routine 300 proceeds to operation 310, where the unstructured data processing platform 102 may conduct a search on the unstructured data 210 using the converted unstructured query 214 and return unstructured query results 216. The unstructured query results 216 may then be presented to the user or otherwise provided through the requestor through the SDM application 202 at operation 312. As mentioned above, in order for the SDM application 202 to understand and present query results, the unstructured query results 216 need to be reorganized or mapped into structured query results 218 based on the extracted data structure in operation 312.

From operation 312, the routine 300 proceeds to operation 314, where a determination is made if more queries have been submitted through the SDM application 202. If more queries have been received, the routine 300 returns to operation 302 where additional queries may be received and processed in a similar fashion as described above. If, at operation 314, it is determined that there no more queries to be processed, the routine proceeds to operation 316, where it ends.

Figure 4:
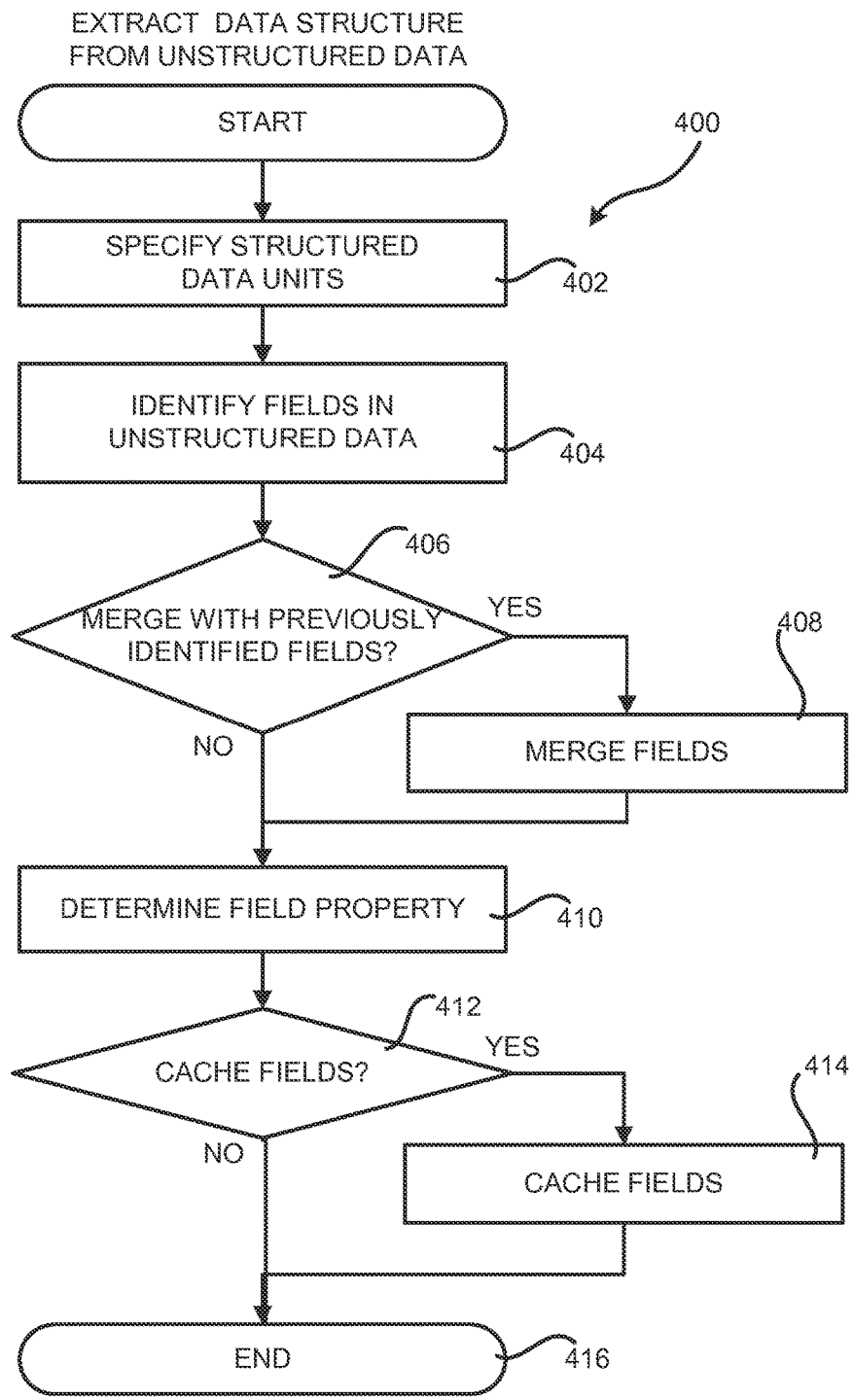
FIG. 4 is a flow diagram showing aspects of an illustrative process for extracting a data structure from unstructured data, according to one embodiment disclosed herein.
Figure 5:
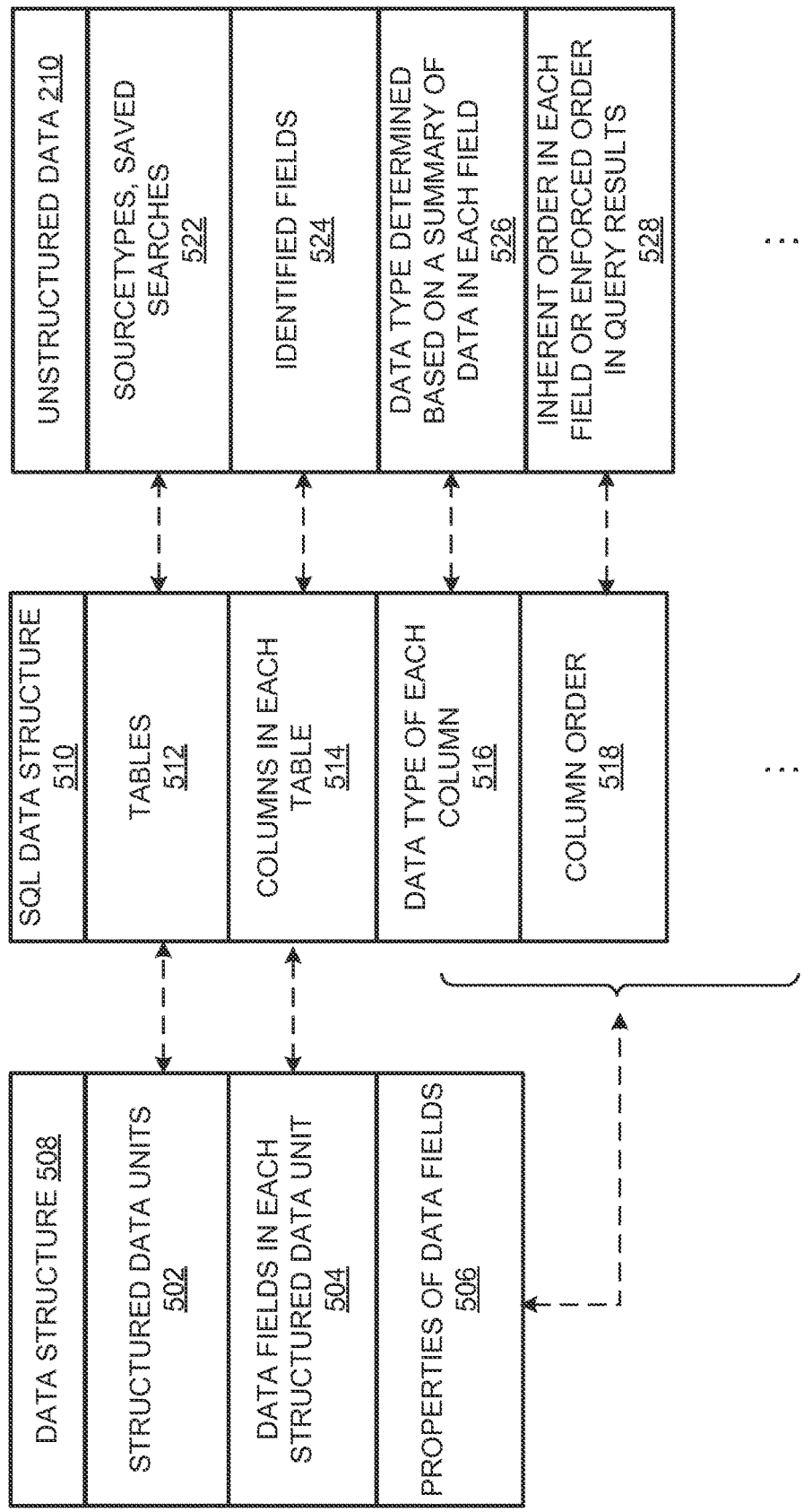
FIG. 5 is a block diagram illustrating aspects of one process for mapping unstructured data to structured data, according to one embodiment disclosed herein.

FIG. 4 is a flow diagram showing aspects of an illustrative routine 400 for extracting a data structure from unstructured data, according to one embodiment disclosed herein. In one embodiment, the structure extractor 204 described above with regard to FIG. 2 performs the routine 400. Other components might also perform the functionality shown in FIG. 4 in other implementations. The routine 400 will be described in conjunction with FIG. 5, which is a block diagram illustrating various components of a data structure 508. FIG. 5 also illustrates a data structure defined in SQL and the ODBC standard, referred to herein as the "SQL data structure 510." The SQL data structure 510 is utilized as one embodiment of the data structure 508.

The data structure 508, as shown in FIG. 5 and discussed briefly above, includes components such as the structured unit's 502, data fields 504 in each structured data unit 502, and properties 506 of each data field 504. A structured unit 502 contains a set of data elements that may share certain common properties and can be classified as one single group. Examples of structured units 502 include, but are not limited to, tables 512 contained in a SQL data structure 510, worksheets in a spreadsheet document created by a spreadsheet application such as MICROSOFT EXCEL from MICROSOFT Corporation in Redmond, Wash., and others. Taking tables 512 as an example, each table 512 is a set of data elements that is organized using a model of vertical columns and horizontal rows. Each table 512 has a specified number of columns, but can have any number of rows.

For each of the structured data units 502, there may be one or more data fields 504 for organizing and describing the data contained in the structured data unit 502. In the SQL data structure 510, for example, the data fields 504 may include vertical columns 514 in a table 512. To further describe data in each field 504, a data structure 508 may also include properties 506 for each data field 504 to characterize attributes of the data field 504, such as data types, data ranges, orders and/or other constrains on the data contained in the data field 504. In the SQL data structure 510, the properties 506 of data fields may include data type 516 of each column, column order 518 and other attributes defined for each column 514.

Referring back to FIG. 4, the routine 400 begins at operation 402, where the structure extractor 204 specifies or identifies structured data units 502. According to one embodiment, the structured data units 502 may be predetermined based on prior knowledge about the unstructured data 210. Taking the SQL data structure 510 as an example, FIG. 5 also illustrates mapping various elements of unstructured data 210 to components of an SQL data structure 510, according to one embodiment disclosed herein. As shown in FIG. 5, source types and/or saved searches 522 of the unstructured data 210 may be specified as tables 512. As explained above with regard to FIG. 1, an event in the unstructured data 210 may bear some basic structure consisting of fields such as time, source, source type, host and event text. Source type is a concept that is used to group similar data sources, and is determined by looking at rules defined for the source or via a clustering algorithm on data content. Based on this prior knowledge, data belonging to one source type may be specified as one table 512. Similarly, according to various implementations, there may be saved search results stored as part of the unstructured data 210. Each of these saved search results may also be specified as one table 512.

From operation 402, the routine 400 proceeds to operation 404, where the structure extractor 204 may identify data fields 504 for each structured data unit 502 in the unstructured data 210. For an SQL data structure 510, columns 514 in each table 512 may be determined at operation 402. According to one embodiment, columns 514 may be determined as data fields 524 identified from the unstructured data 210. To identify data fields 524, the structure extractor 204 may issue and execute a pilot query on a subset of the unstructured data 210. A pilot query is a query primarily utilized to discover data fields 524 of unstructured data 210. The pilot query can take various forms and may contain commands to further identify aspects of the data fields 524, such as properties and/or statistics. For example, the structure extractor 204 may issue a pilot query written in SPL-like format as search sourcetype=firewallA|listfield-all.

The above example pilot query requests listing all the fields contained in the data of source type "firewallA." As discussed above, data within a source type 522 may be specified as a table 514. Thus, the data field 524 retrieved through this pilot query may be mapped to columns 514 of a table 512 corresponding to the source type "firewallA." It should be appreciated that this example is only illustrative and is not intended to limit the pilot query to any particular form. Other pilot queries may be issued, such as by further limiting the number of events to be utilized to identify the fields. This type of further condition added in a pilot query may be helpful, for example, to reduce computation consumption to improve efficiency or when the unstructured data 210 are time-sensitive and recent data is more meaningful than old data. In the latter case, more accurate fields may be obtained by limiting the unstructured data used for identifying the data fields to only a certain number of recent events.

Upon receiving the pilot query, the unstructured data processing platform 102 may utilize various mechanisms to identify the data fields from the unstructured data 210. For example, the unstructured data 210 may contain event data for which some fields have been explicitly defined. FIG. 6 shows example event data that includes the fields date 602, time 604, label 606, and event text 608. These explicit fields in the event data may be selected as data fields 524 of the unstructured data 210 and further mapped to columns 514 of the corresponding table 512.

Additionally, or alternatively, in some embodiments the fields 524 of the unstructured data 210 may be identified automatically by leveraging the format of the unstructured data 210. For example, consider the following set of events presented in a JSON-like format:

Event 1: {"foo": 1, "other": "abc"};
Event 2: {"foo": 20};
Event 3: {"bar": Nov. 20, 2012, "foo": 50, "other": "xyz"}.

If all three events were ingested by the unstructured data processing platform 102, and a pilot query was issued to discover the fields for this set of unstructured data or events, the results would be:

Field/Column 1: 'foo' [number];
Field/Column 2: 'other' [string];
Field/Column 3: 'bar' [date].

Due to the special format of this event data, the fields may be automatically extracted by analyzing, for example, the delimiters in the event data, such as commas, colons or the quotation marks.

According to one embodiment, at any time prior to query time, an unstructured data indexing module or other modules (not shown) in the unstructured data processing platform 102 may be employed to index unstructured data. Once the unstructured data has been indexed, a schema, such as a late binding schema discussed above, may be developed to define a structure, such as fields, for the unstructured data. In this embodiment, the pilot query may obtain metadata about the fields that have already been developed for the schema in the unstructured data indexing module or a corresponding module. In the case of late binding schema, once the unstructured data is indexed into events and stored in the time series data store, the schema for a subset of those events can be developed at any time prior to query time, even though actual values are not extracted from the event data in the time series data store 114 using the schema until query time. Consequently, the schema for the unstructured data indexing module or the corresponding module may exist before a structured query is received, which allows identifying relevant fields in the unstructured data on-the-fly to enable translating a structured query into an unstructured query.

It should be appreciated that the field extraction methods described above are provided by way of illustration only and should not be construed as limiting. Various field extraction methods or various implementations of the field extraction methods presented above may be employed. It should be further appreciated that certain queries on unstructured data 210 may result in new fields dynamically based on the presence of other fields. For example, a query for last name and first name may lead to a new field of full name in the query results. In such a scenario, the fields should be identified directly from the query itself.

As mentioned above, the late-binding schema imposes structure on the unstructured data 210 at query time rather than previously thereto, such as at data storage or ingestion time. As such, as the unstructured data 210 changes, the extracted data fields 524 may also change. For instance, if the field extraction called by the pilot query was performed at time t, the obtained set of identified fields 524 may be different from the set of identified field 524 by executing a pilot query at time t+10. The difference may be because of the arrival of new data, the deletion of old data, or a different set of unstructured data utilized for the data field extraction. Referring back to the example shown above, if the pilot search was run only on a set of unstructured data containing events 1 and 2, the extracted results would become:

Field/Column 1: 'foo' [number];
Field/Column 2: 'other' [string].

Considering the dynamic nature of fields identified from the unstructured data through the unstructured data processing platform 102, previously extracted fields or the unstructured data 210 utilized for extracting the previous fields may be cached for providing a richer set of fields that are available in the unstructured data 210. For example, the extracted fields 524 obtained at operation 404 may be merged with previously extracted fields. Alternatively, it may be determined that the current extracted fields are utilized without any merging. Such a determination is made at operation 406 of routine 400.

From operation 406, the routine 400 proceeds to operation 410 if it is determined that no merging is to be performed. Otherwise, the routine 400 proceeds to operation 408. At operation 408, the fields identified at operation 404 are merged with previously extracted fields. According to implementations, such a merge may be achieved by taking the union of the two sets of fields, or by taking the union of the unstructured data utilized for extracting the two sets of fields and then identifying fields directly from the union.

From operation 408, the routine proceeds to operation 410, where properties of the identified fields 524 are determined. For a SQL data structure 510, these properties may include the data type 516 of each column 514 in a table 512, column order 518 and others. The data type 516 of each column 514, for instance, may be determined from a data type 526 for each identified field 524.

According to one implementation, raw data from an identified field 524 is summarized with occurrence information for each data type in the field, based on which it is then determined which data type the field should be coerced into. For example, a summary might show that 30% of the values in a field 524 are numbers and also that 70% of the numbers in the field are strings. In such a situation, it may further be determined that the field 524 has a data type of string. The summary information may be obtained by adding a summary command in the pilot query when discovering the fields 524, or by issuing a new query.

For other properties 506 of data fields, such as the column order 518, the unstructured data platform 102 may be able to provide similar properties from the unstructured data 210, or these properties may be derived or enforced when necessary. Taking the column order 518 as an example, if the unstructured data 210 does not possess a certain order for an extracted field 524, a column order 518 can instead be enforced. This can be achieved, for example, by observing an order from the data in an identified field 524 in a first query result, and then reordering data for subsequent query results according to the observed order for that identified field 524.

From operation 410, the routine 400 proceeds to operation 412, where the SDM driver 140 determines if the identified fields are to be cached. As discussed above, cached fields may be merged with newly identified fields to provide a more complete set of fields contained in the unstructured data 210. If, at operation 412, it is determined that the fields are to be cached, the identified fields may be put into a cache. Additionally, or alternatively, the unstructured data 210 utilized for identifying the fields may be cached. From operation 414, or if it is determined at operation 412 that caching is not necessary, the routine 400 proceeds to operation 416, where it ends.

It should be appreciated that due to the dynamic nature of the unstructured data and the extracted data structure therefrom, and various other reasons, extracting a data structure as shown in the routine 400 may be performed at different time points to achieve different goals. For example, in the embodiment illustrated in FIG. 3, the routine 400 is executed upon receiving the unstructured query to discover a data structure contained in the unstructured data 210 on the fly. In another embodiment, the extraction of data structure may be performed before the receipt of the structured query to reduce any possible delay caused by extracting the data structure. Other embodiments may require the routine 400 to be executed continuously to keep the extracted data structure as complete and up-to-date as possible.

Figure 7:
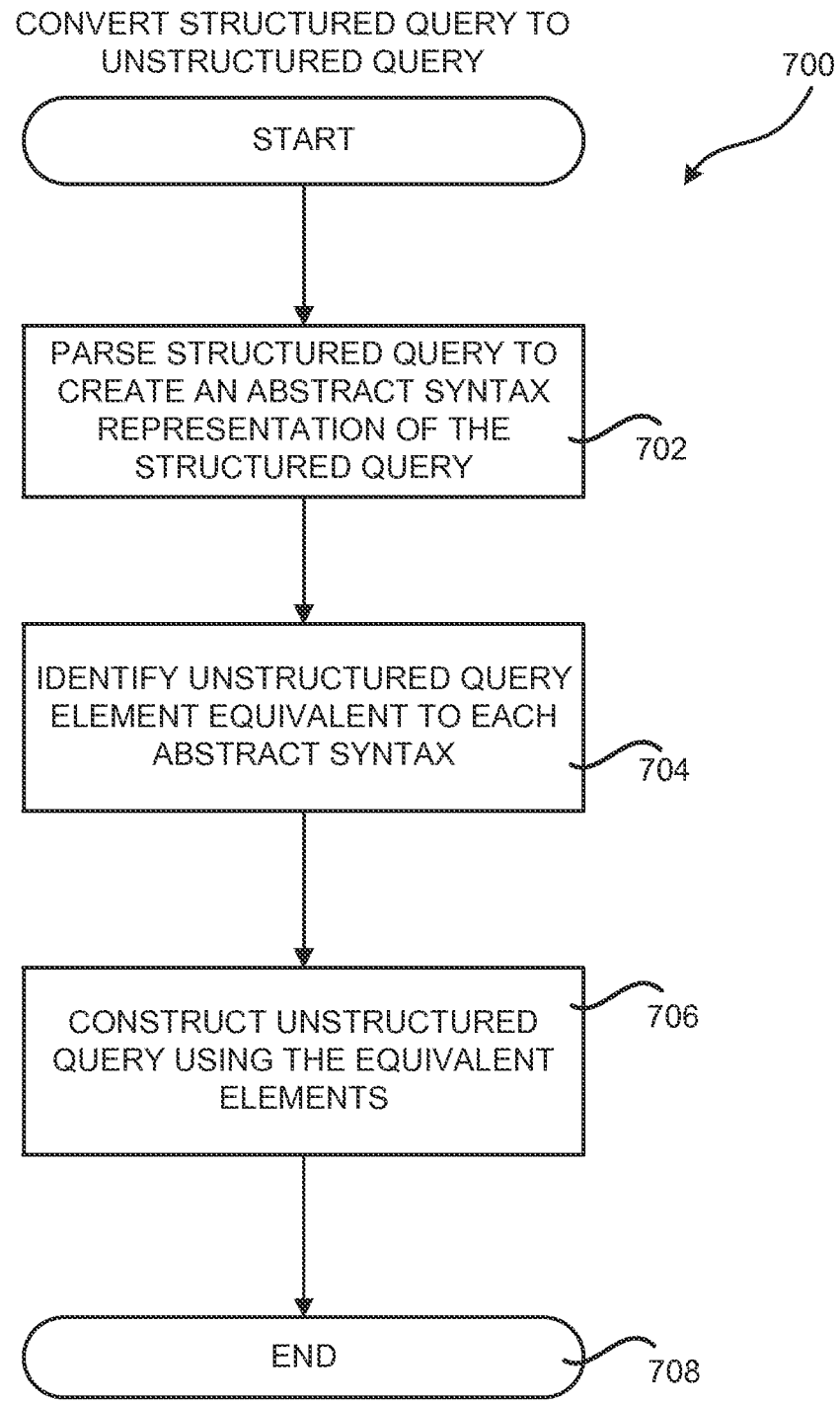
FIG. 7 is a flow diagram showing aspects of one illustrative process for converting a structured query into an unstructured query, according to one embodiment disclosed herein.

FIG. 7 shows an illustrative process 700 for converting a structured query to an unstructured query according to one embodiment disclosed herein. In one embodiment, the query convertor 206 described above with regard to FIG. 2 performs the routine 400. It should be understood that other modules or components of the SDM driver 140, the unstructured data processing platform 102, or the SDM application 202 may be utilized to achieve the functionality illustrated in routine 700.

The routine 700 starts at operation 702 where the query convertor 206, upon receiving a structured query 212, parses the structured query 212. The parsing may create an abstract syntax representation of the structured query 212 using one or more syntax objects. For example, a SQL query "SELECT foo FROM bar WHERE foo==2" may be parsed to identify syntax objects that include a command "SELECT," a table "bar," a column "foo" in the table "bar," and a condition "foo==2."

From operation 702, the routine 700 proceeds to operation 704 where the query converter 206 identifies one or more elements in an unstructured query language, such as SPL, that can be considered as equivalent to the syntax objects identified in operation 702. Any data field specified by the syntax objects may also be mapped to the corresponding identified fields 524 in the extracted data structure. In the above example, the command "SELECT" may be mapped to a command "search" in SPL; the table "bar" may be constructed from a source type "bar" that contains a field "foo" as specified in the extracted data structure, and the condition "foo==2" may be mapped to an SPL command "where foo=2." Once the equivalent elements in the unstructured query language have been identified, the routine 700 proceeds to operation 706, where the query converter 206 may construct the unstructured query 214 from the identified equivalent elements. Continuing the above example, the constructed SPL would be "search sourcetype=bar| where foo=2." From operation 706, the routine 700 proceeds to operation 708, where it ends.

While FIGS. 4-7 primarily disclose, in the context of the unstructured data processing platform 102 depicted in FIG. 1, extracting SQL data structures from unstructured data 210 and converting SQL to SPL, it should be appreciated that data structure extraction and query conversion for other type of structured and unstructured data may be achieved in a similar fashion.

Figure 8:
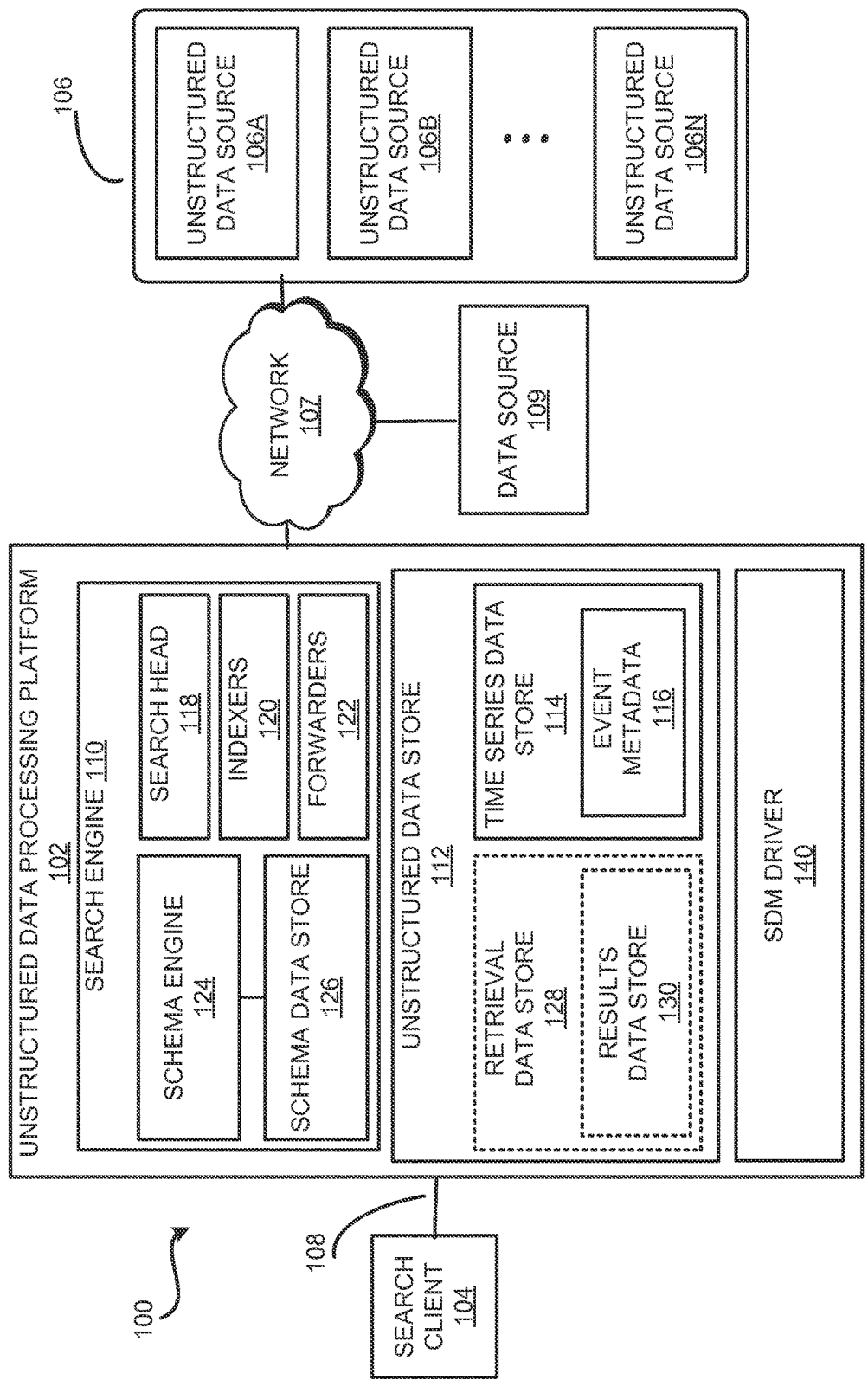
FIG. 8 is a system diagram showing additional details regarding the illustrative operating environment shown in FIG. 1, in accordance with some embodiments.

FIG. 8 is a system diagram showing additional details regarding the illustrative operating environment shown in FIG. 1, in accordance with some embodiments. As described above with regard to FIG. 1, the operating environment 100 includes the unstructured data processing platform 102. As also discussed above, the unstructured data processing platform 102 performs searches requested by a search client 104 on unstructured data provided by unstructured data sources 106. In some configurations, the searches may be performed on data other than unstructured data, such as data from the data source 109. The unstructured data processing platform 102 might also enable other types of functionality to be performed on unstructured data.

The search client 104 may vary depending on the configuration of the particular computing device or system. For example, the search client 104 may be a software application running on the same device as the unstructured data processing platform 102. In another example, the search client 104 may be a local computing device that accesses the unstructured data processing platform 102 being executed on a remote computing device. The presently disclosed subject matter is not limited to any functional, communicative, or physical connection between the search client 104 and the unstructured data processing platform 102.

The search client 104 transmits instructions to the unstructured data processing platform 102 via a communication pathway 108. The communication pathway 108 may vary depending on the configuration of the operating environment 100. For example, and not by way of limitation, the unstructured data processing platform 102 and the search client 104 may reside on the same local computing device or reside on different computing devices in a LAN, WAN, distributed computing environment, and the like.

As discussed above, the unstructured data processing platform 102 may receive a search request from the search client 104 and, in response thereto, may invoke a search engine 110. The search request may include, but is not limited to, search instructions. The search instructions may provide to the search engine 110 additional search parameters defining aspects of the manner in which a search is to be performed. For example, and not by way of limitation, a search parameter may indicate to the unstructured data processing platform 102 that it should conduct a search on data provided by the unstructured data sources 106 periodically at time intervals defined by the search instructions. In another example, the search instructions may include one or more metrics as part of the search query. The search instructions may include other items such as filters, keywords, and the like, the present disclosure of which is not limited to any particular form or content of the search instructions.

As also described above, in some configurations the unstructured data processing platform 102 is configured to use late-binding schema in order to facilitate the searches. As discussed above, schema used to process the search may be applied by the unstructured data processing platform 102 at the time of the search. Although the presently disclosed subject matter is not limited to any particular benefit, in some configurations, the use of late-binding schema may provide certain benefits. For example, changes in fields applied to the unstructured data are substantially or fully inconsequential, as the field designations are not applied to unstructured data until search time. If the data was bound to a certain schema prior to search time, such as in traditional databases, changes in fields applied to the previously structured data would need to be applied to the data prior to searching the data, which would necessitate the re-indexing of the data.

The unstructured data store 112 is utilized to store unstructured data received from the unstructured data sources 106 prior to any extraction of information, including timestamps, contained in or associated with the data. The unstructured data store 112 may be utilized as the incoming data store for the data from either the unstructured data sources 106 or the data source 109. After the data from either the unstructured data sources 106 or the data source 109 is received and stored in the unstructured data store 112, the data is broken into event data and stored using a timestamp in a time series data store 114.

As discussed above, some unstructured data, and thus event data obtained therefrom, has associated metadata. In such a scenario, metadata for each event may be stored in the time series data store 114 as event metadata 116. The event metadata 116 may include, but is not limited to, a timestamp, the data source type, the data source, the host, event text and the like.

When an event is received at the unstructured data store 112 from one of the unstructured data sources 106, a timestamp associated with the event is extracted from the event. Using the timestamp, the unstructured data processing platform 102 may organize the unstructured data provided by the unstructured data sources 106 into mutually exclusive time spans to create event chunks. Based on the event chunks, indexing may be performed to sort or partition the unstructured data into event data. According to some configurations, the indexing of unstructured data is performed well before the search time so that a schema can be developed after indexing and before search time.

As part of the functionality relating to a search, the search engine 110 may include a search head 118, a plurality of indexers 120, and a plurality of forwarders 122. The search head 118 is responsible for providing a single query point for the unstructured data processing platform 102. In some configurations, when the search engine 110 is invoked, the search engine 110 will access the search head 118 to perform a retrieval of relevant data from the time series data store 112. In further configurations, the search head 118 will perform a filtering function to narrow the search results into data fitting the schema of the search results. The forwarders 122 are responsible for gathering event information from the unstructured data store 112 and providing that information to the indexers 120. The indexers 120 are responsible for indexing received events and servicing search queries received from the search head 118.

In some configurations, before a search is commenced, a time range is determined for the search as well as any keywords required to filter the search results to return specific data. The retrieval phase uses these parameters to query the time series data store 112 to return retrieval data stored in the retrieval data store 128. The retrieval data store 128 is shown having a dashed line because the retrieval data store 128 may be a temporary construct within the unstructured data store 112 or may be permanent. For example, after the search is processed, the data in the retrieval data store 128 may be removed and the retrieval data store 128 may be eliminated. In other configurations, the data in the retrieval data store 128 may be stored for longer periods of time or may be maintained through several search processes. A schema provided by the schema engine 124 is applied and the process enters a filtering phase, with the results stored in the results data store 130.

The schema engine 124 may access templates stored in the schema data store 126 to use in a search. A template stored in the schema data store 126 may include one or more field designations and define the manner in which the search engine 118 delimits the unstructured data to process the search. In some configurations, a template may be a pre-defined set of fields a user can apply to an unstructured data source. A user can apply a pre-existing template or save a current configuration as a template for future use. Templates may be classified according to their signature, which is an ordered set of fields. For example, the unstructured data may include two fields of data separated by a semicolon. A template may be stored in the schema data store 126 and accessed by the schema engine 124 to instruct the search head 118 that the first field is a time field, the second field is a personal identification field, and that the two fields are separated by a semicolon. The search head 118 may in turn use this template to perform a search on the unstructured data store 112 or the time series data store 114.

In a manner similar to the retrieval data store 128, the results data store is shown having a dashed line because of the possible temporary nature of the results data store 130. The results of the search stored in the results data store 130 are provided to the search head 118, which in turn provides the results to the search engine 110 to perform a search process. It should be appreciated that the operation of the unstructured data processing platform 102 might include many other operations and components than those described herein. Additionally, the unstructured data processing platform may be configured to provide other types of functionality than those specifically described herein.

Figure 9:
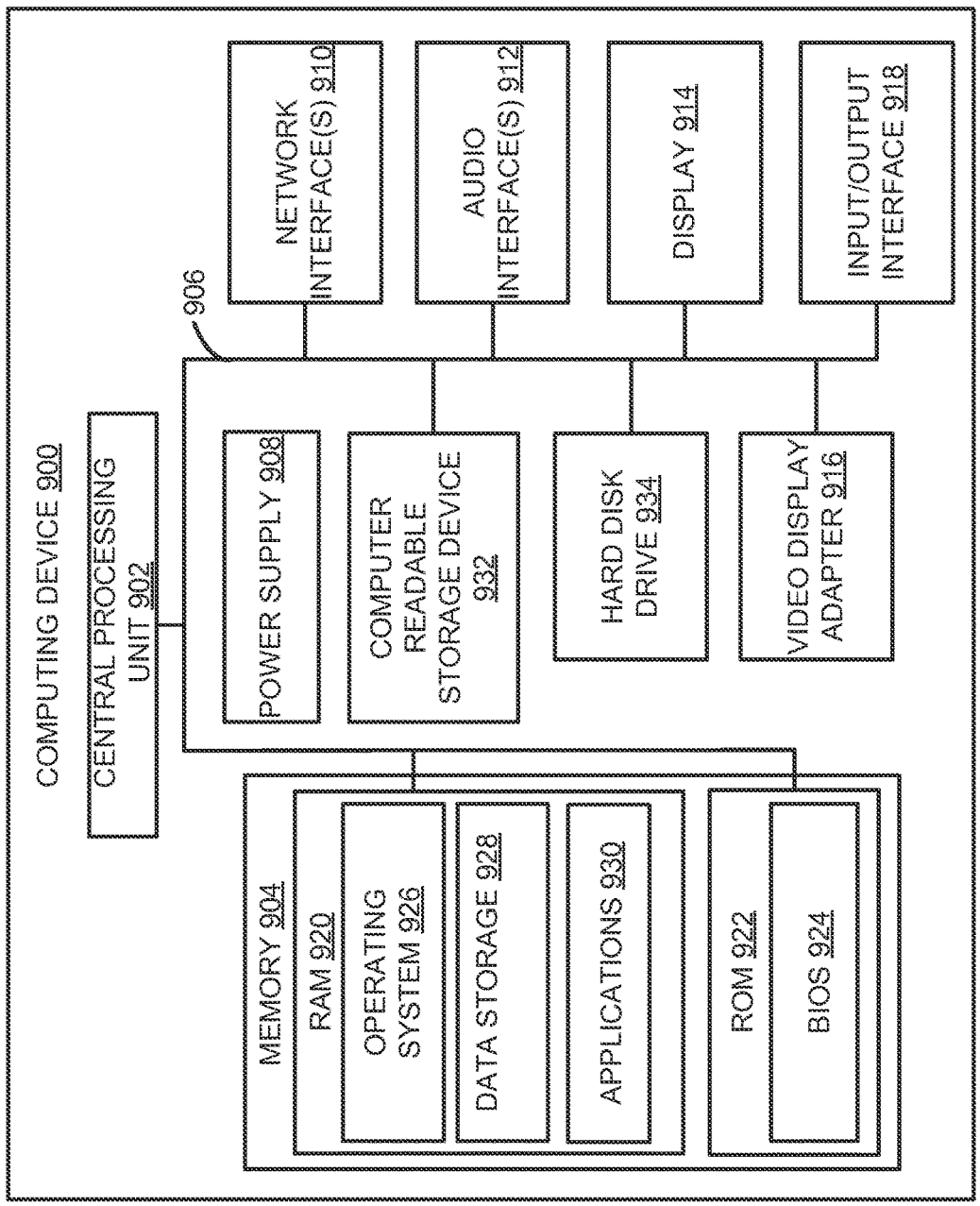
FIG. 9 is a computer architecture diagram showing aspects of an illustrative computing device architecture that may be utilized to implement aspects of the embodiments presented herein.

FIG. 9 is a computer architecture diagram showing aspects of an illustrative computing device architecture that may be utilized to implement aspects of the embodiments presented herein. In particular, the computer architecture shown in FIG. 9 may be utilized to implement a computing device 900 for implementing various components described above with regard to the operating environment 100. The computing device 900 may include more or fewer components than those shown in FIG. 9. However, the components shown are sufficient to disclose an illustrative embodiment for practicing the presently disclosed subject matter. The computing device 900 may be configured to act as a client, server, or various other types of computing devices depending on the particular system in and purpose for which the computing device 900 is used.

As shown in FIG. 9, the computing device 900 includes one or more central processing units ("CPUs") 902 in communication with a mass memory 904 via a bus 906. The computing device 900 also includes a power supply 908, one or more network interfaces 910, an audio interface 912, a display 914, a video display adapter 916, and an input/output interface 918. The power supply 908 provides power to the computing device 900.

The network interface 910 includes circuitry for coupling the computing device 900 to one or more networks, and is constructed for use with one or more communication protocols and technologies including, but not limited to, global system for mobile communication ("GSM"), code division multiple access ("CDMA"), time division multiple access ("TDMA"), user datagram protocol ("UDP"), transmission control protocol/Internet protocol ("TCP/IP"), Short Message Service ("SMS"), general packet radio service ("GPRS"), Wireless Application Protocol ("WAP"), ultra wide band ("UWB"), Institute of Electrical and Electronics Engineers ("IEEE") 802.16 Worldwide Interoperability for Microwave Access ("WiMax"), Session Initiation Protocol ("SIP")/Real-time Transport Protocol ("RTP"), or any of a variety of other communication protocols. Network interface Z36 is sometimes known as a transceiver, transceiving device, or network interface card ("NIC").

The audio interface 912 is arranged to produce and receive audio signals such as the sound of a human voice. For example, the audio interface 912 may be coupled to a speaker and microphone (not shown) to enable telecommunication with others and/or generate an audio acknowledgement for some action. The display 914 may be a liquid crystal display ("LCD"), gas plasma, light emitting diode ("LED"), or any other type of display used with a computing device. The display 914 may also include a touch sensitive screen arranged to receive input from an object such as a stylus or a digit from a human hand.

The computing device 900 also comprises the input/output interface 918 for communicating with external devices, such as a keyboard, or other input or output devices not shown in FIG. 9. The input/output interface 918 can utilize one or more communication technologies, such as USB, infrared, Bluetooth™, or the like.

The mass memory 904 includes a Random Access Memory ("RAM") 920, a Read Only Memory ("ROM") 922, and other storage means. The mass memory 904 illustrates an example of computer readable storage media for storage of information such as computer readable instructions, data structures, program modules or other data. The mass memory 904 stores a basic input/output system ("BIOS") 924 for controlling low-level operation of the computing device 900. The mass memory 904 also stores an operating system 926 for controlling the operation of the computing device 900. It will be appreciated that the operating system 926 may include a general-purpose operating system such as a version of UNIX, or LINUX, or a specialized client communication operating system such as WINDOWS MOBILE, or the SYMBIAN operating system. The operating system 926 may include, or interface with a JAVA virtual machine module that enables control of hardware components and/or operating system operations via JAVA application programs.

The mass memory 904 further includes data storage 928, which can be utilized by the computing device 900 to store, among other things, applications 930 and/or other data. For example, the data storage 928 may also be employed to store information that describes various capabilities of the computing device 900. The information may then be provided to another device based on any of a variety of events, including being sent as part of a header during a communication, sent upon request, or the like.

At least a portion of the information may also be stored on a disk drive or other computer-readable storage device 932 within the computing device 900 or in communication with the computing device 900. The data storage 928 may further store event data, metadata, and search results. Such event data, metadata, and local search results may also be stored within any of a variety of other computer-readable storage devices, including, but not limited to a hard drive, a portable storage device, or the like, such as illustrated by the computer-readable storage device 932.

If the computing device 900 is used as a server that receives unstructured data from one or more unstructured data sources 106, the data storage 928 may store an ordered list of event data references. An ordered list of event data references may include a list of event data references received from a plurality of the unstructured data sources 106. In one embodiment, the ordered list of event data references is generated by sorting data references received from each of the unstructured data sources 106 according to a common field, such as a timestamp, a number a string, or the like. In one embodiment, each element of the ordered list includes a reference to one of the unstructured data sources 106 the event data is stored on or provided by, an offset or other pointer to the event data on that unstructured data source, and optionally the value used to sort the ordered list.

The applications 930 may include computer executable instructions which, when executed by the computing device 900, transmit, receive, and/or otherwise process data. Other examples of application programs include calendars, search programs, email clients, IM applications, SMS applications, Voice Over IP ("VOIP") applications, contact managers, task managers, transcoders, database programs, word processing programs, security applications, spreadsheet programs, games, search programs, data log recording programs, and so forth.

The application 930 may include an SDM driver for executing queries expressed with reference to a structured query language against unstructured data. The SDM driver may perform operations such as extracting data structures from unstructured data, and converting structured queries to unstructured queries based on the extracted data structures, as described herein. In some embodiments, the SDM driver described herein might be stored on the computer-readable storage device 932, a hard disk drive 934, or the like.

The mass memory 904 as described above illustrates another type of computer-readable media, namely computer-readable storage media and/or processor-readable storage medium. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, EEPROM, flash memory or other memory technology, Compact Disc ROM ("CD-ROM"), digital versatile disks ("DVD") or other optical storage, magnetic cassettes, magnetic tape, magnetic disk storage or other magnetic storage devices, or any other non-transitory physical medium which can be used to store the desired information and which can be accessed by a computing device.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method comprising:
   storing unstructured data in an unstructured data store, wherein at least some of the unstructured data remains unstructured in the unstructured data store;
   receiving, at a query converter, a structured query in a structured query language from an application;
   identifying a field in data stored in the unstructured data store, based on an extraction rule that specifies where to find a subportion of text within a segment of the data;
   generating, by the query converter, a second query in a second query language associated with the unstructured data store, based on the structured query;
   causing execution of the second query against the unstructured data stored in the unstructured data store;
   receiving a result of execution of the second query against the unstructured data stored in the unstructured data store, the result including a value for the field; and
   causing an indication of the result to be provided to the application for output to a user.

2. A computer-implemented method as recited in claim 1, wherein at least some of the unstructured data is stored in the unstructured data store in a JSON format or a JSON-based format.

3. A computer-implemented method as recited in claim 1, wherein the unstructured data store is not compatible with structured query language queries.

4. A computer-implemented method as recited in claim 1, wherein at least some of the unstructured data is stored in the unstructured data store in a JSON format or a JSON-based format, and wherein the unstructured data store is not compatible with structured query language queries.

5. A computer-implemented method as recited in claim 1, wherein the unstructured data store does not include a relational database.

6. A computer-implemented method as recited in claim 1, wherein the unstructured data comprises time-series data, and the unstructured data store comprises a time-series data store.

7. A computer-implemented method as recited in claim 1, wherein the unstructured data comprises time-series data, the unstructured data store comprises a time-series data store, and at least some of the unstructured data is stored in the unstructured data store in a JSON format or a JSON-based format.

8. A computer-implemented method as recited in claim 1, further comprising:
   in response to receiving the result of execution of the second query against the unstructured data stored in the unstructured data store, converting the result into a format compatible with an output capability of the application, prior to causing the indication of the result to be provided to the application for output to the user.

9. A computer-implemented method as recited in claim 1, further comprising:
   applying a schema to the data in the unstructured data store after storing data in the unstructured data store, to impose a structure on the unstructured data.

10. A computer-implemented method as recited in claim 1, wherein the unstructured data includes data indicative of performance or operation of one or more components of an information technology environment.

11. A computer-implemented method as recited in claim 1, wherein the unstructured data includes data indicative of performance or operation of one or more components of an information technology environment, including log data.

12. A computer-implemented method as recited in claim 1, further comprising:
   segmenting the unstructured data into a plurality of events; and
   generating a timestamp for each event;
   wherein the storing unstructured data in the unstructured data store comprises storing the events in the unstructured data store in association with associated timestamps.

13. A computer-implemented method as recited in claim 1, further comprising:
   transmitting a pilot query to the unstructured data store;
   responsive to the pilot query, receiving a plurality of records generated by execution of the pilot query against the unstructured data in the unstructured data store, each record including one or more pairs of field names and values;

automatically identifying field names and data types from the pairs in the plurality of records generated by execution of the pilot query against the unstructured data store; and defining a first set of fields that corresponds to the identified field names and data types.

14. A computer-implemented method as recited in claim 1, further comprising:

transmitting a pilot query to the unstructured data store prior to the receiving the structured query at the query converter;

responsive to the pilot query, receiving a plurality of records generated by execution of the pilot query against the unstructured data in the unstructured data store, each record including one or more pairs of field names and values;

automatically identifying field names and data types from the pairs in the plurality of records generated by execution of the pilot query against the unstructured data store; and defining a first set of fields that corresponds to the identified field names and data types.

15. A computer-implemented method as recited in claim 1, further comprising:

transmitting a pilot query to the unstructured data store;

responsive to the pilot query, receiving a plurality of records generated by execution of the pilot query against the unstructured data in the unstructured data store, each record including one or more pairs of field names and values;

automatically identifying field names and data types from the pairs in the plurality of records generated by execution of the pilot query against the unstructured data store; and defining a first set of fields that corresponds to the identified field names and data types;

wherein the causing execution of the second query against the unstructured data stored in the unstructured data store causes one or more values for one or more fields included in the second query to be extracted from the unstructured data store;

the method further comprising:

receiving the extracted values for the fields included in the unstructured query from the unstructured data store.

16. A computer-implemented method as recited in claim 1, further comprising:

transmitting a pilot query to the unstructured data store;

responsive to the pilot query, receiving a plurality of records generated by execution of the pilot query against the unstructured data in the unstructured data store, each record including one or more pairs of field names and values;

automatically identifying field names and data types from the pairs in the plurality of records generated by execution of the pilot query against the unstructured data store;

defining a first set of fields that corresponds to the identified field names and data types; and caching the first set of fields.

17. A computer-implemented method as recited in claim 1, further comprising:

transmitting a pilot query to the unstructured data store on a subset of records in the unstructured data store, wherein the subset of the records is of a definable size;

responsive to the pilot query, receiving a plurality of records generated by execution of the pilot query against the unstructured data in the unstructured data store, each record including one or more pairs of field names and values;

automatically identifying field names and data types from the pairs in the plurality of records generated by execution of the pilot query against the unstructured data store, as a function of a formatting of the records; and defining a first set of fields that corresponds to the identified field names and data types.

18. A computer-implemented method as recited in claim 1, wherein generating the second query in the second query language associated with the unstructured data store is based on an identification of the field resulting from said identifying.

19. A computer-implemented method as recited in claim 1, wherein the indication of the result of execution of the second query is provided to the application as a direct response to the unstructured query, without requiring any additional query from the application.

20. A non-transitory computer-readable storage medium having computer-executable instructions stored thereupon which, when executed by one or more computing devices, cause the computing devices to perform actions including:

storing unstructured data in an unstructured data store, wherein at least some of the unstructured data remains unstructured in the unstructured data store;

receiving a structured query in a structured query language from an application;

identifying a value of a field in data stored in the unstructured data store, based on an extraction rule that specifies where to find a subportion of text within a segment of the data;

generating a second query in a second query language associated with the unstructured data store, based on the structured query;

causing execution of the second query against the unstructured data stored in the unstructured data store;

receiving a result of execution of the second query against the unstructured data stored in the unstructured data store; and causing an indication of the result to be provided to the application for output to a user.

21. A non-transitory computer-readable storage medium as recited in claim 20, wherein at least some of the unstructured data is stored in the unstructured data store in a JSON format or a JSON-based format.

22. A non-transitory computer-readable storage medium as recited in claim 20, wherein the unstructured data store is not compatible with structured query language queries.

23. A non-transitory computer-readable storage medium as recited in claim 20, wherein the unstructured data store does not include a relational database.

24. A non-transitory computer-readable storage medium as recited in claim 20, wherein the unstructured data comprises time-series data, the unstructured data store comprises a time-series data store, and at least some of the unstructured data is stored in the unstructured data store in a JSON format or a JSON-based format.

25. A non-transitory computer-readable storage medium as recited in claim 20, further comprising:

applying a schema to the data in the unstructured data store after storing data in the unstructured data store, to impose a structure on the unstructured data.

26. A non-transitory computer-readable storage medium as recited in claim 20, wherein the unstructured data includes data indicative of performance or operation of one or more components of an information technology environment.

27. A computer system comprising:
   at least one processor; and
   memory coupled to the at least one processor and containing instructions that, when executed by the at least one processor, cause the computer system to perform operations including:
      storing unstructured data in an unstructured data store, wherein at least some of the unstructured data remains unstructured in the unstructured data store;
      receiving a structured query in a structured query language from an application;
      identifying a value of a field in data stored in the unstructured data store, based on an extraction rule that specifies where to find a subportion of text within a segment of the data;
      generating a second query in a second query language associated with the unstructured data store, based on the structured query;
      causing execution of the second query against the unstructured data stored in the unstructured data store;
      receiving a result of execution of the second query against the unstructured data stored in the unstructured data store; and
      causing an indication of the result to be provided to the application for output to a user.

28. A computer system as recited in claim 27, wherein at least some of the unstructured data is stored in the unstructured data store in a JSON format or a JSON-based format.

29. A computer system as recited in claim 27, wherein the unstructured data store is not compatible with structured query language queries.

30. A computer system as recited in claim 27, wherein the unstructured data store does not include a relational database.

31. A computer system as recited in claim 27, wherein the unstructured data comprises time-series data, the unstructured data store comprises a time-series data store, and at least some of the unstructured data is stored in the unstructured data store in a JSON format or a JSON-based format.

32. A computer system as recited in claim 27, further comprising:
   in response to receiving the result of execution of the second query against the unstructured data stored in the unstructured data store, converting the result into a format compatible with an output capability of the application, prior to causing the indication of the result to be provided to the application for output to the user.

* * * * *